US009616593B2

(12) United States Patent
Elemstrand et al.

(10) Patent No.: US 9,616,593 B2
(45) Date of Patent: Apr. 11, 2017

(54) TILE OR MASONRY SAW ASSEMBLY WITH DOUBLE MOVEMENT

(71) Applicant: HUSQVARNA AB, Huskvarna (SE)

(72) Inventors: Karl Elemstrand, Sävedalen (SE); Petter Nordvall, Västra Frölunda (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/742,863

(22) Filed: Jun. 18, 2015

(65) Prior Publication Data
US 2015/0367527 A1 Dec. 24, 2015

(30) Foreign Application Priority Data

Jun. 19, 2014 (SE) .................................... 14507685

(51) Int. Cl.
B28D 1/04 (2006.01)
B28D 1/02 (2006.01)
B28D 7/04 (2006.01)

(52) U.S. Cl.
CPC ............. *B28D 1/044* (2013.01); *B28D 1/047* (2013.01)

(58) Field of Classification Search
CPC .... B23D 47/025; B23D 47/045; B28D 1/044; B28D 1/047
USPC ........ 83/485–489, 435.11–435.27, 566–570; 125/14
See application file for complete search history.

(56) References Cited

U.S. PATENT DOCUMENTS 3,621,829 A * 11/1971 Maluck .................. B28D 1/047
125/13.03
5,165,203 A * 11/1992 Chuang ................... B24B 21/20
451/297
6,000,387 A * 12/1999 Lee ....................... B23D 47/025
125/11.22
6,080,041 A 6/2000 Greenland
6,119,676 A * 9/2000 Greenland ............. B28D 1/044
125/35

(Continued)

FOREIGN PATENT DOCUMENTS

EP 0032383 A1 7/1981

OTHER PUBLICATIONS

International-Type Search Report of corresponding Swedish application No. 1450768-5, mailed Mar. 19, 2015.

*Primary Examiner* — Joseph J Hail
*Assistant Examiner* — J Stephen Taylor
(74) *Attorney, Agent, or Firm* — Nelson Mullins Riley & Scarborough LLP

(57) ABSTRACT

A tile or masonry saw assembly may include a saw, a frame, and a workpiece support. The saw includes a motor operable to turn a blade assembly to cut a workpiece. The frame is operably coupled to the saw to enable the saw to be moved along the frame in a first direction. The workpiece support is operably coupled to the frame to support the workpiece relative to the saw, and to allow the workpiece support to be moved along the frame. The saw assembly further includes a movement assembly via which both movement of the workpiece support and movement of the saw relative to the frame is accomplished, such that a movement of the work piece support along the frame in a second direction is enabled to cause the saw to move along the frame in the first direction which is opposite the second direction.

14 Claims, 7 Drawing Sheets

(56) References Cited

U.S. PATENT DOCUMENTS

| | | | |
|---|---|---|---|
| 6,427,677 B1* | 8/2002 | O'Banion | B23D 45/02 125/13.01 |
| 7,406,962 B1* | 8/2008 | Chen | B28D 7/04 125/13.01 |
| 2005/0092154 A1 | 5/2005 | Higuchi | |
| 2008/0087153 A1* | 4/2008 | Lee | B23D 45/02 83/435.11 |
| 2009/0211419 A1* | 8/2009 | Wise | B23D 57/0092 83/169 |
| 2009/0277315 A1* | 11/2009 | Ipatenco | B28D 1/047 83/171 |

* cited by examiner

TILE OR MASONRY SAW ASSEMBLY WITH DOUBLE MOVEMENT

CROSS-REFERENCE TO RELATED APPLICATIONS

This application claims priority to Swedish application number 1450768-5 filed Jun. 19, 2014, and said application is expressly incorporated herein in its entirety.

TECHNICAL FIELD

Example embodiments relate to a tile or masonry saw assembly, and more particularly relate to a tile or masonry saw assembly that is configured to improve the capability of the saw to cut larger materials.

BACKGROUND OF THE INVENTION

When a user is laying bricks or other masonry workpieces, sometimes the workpieces need to be cut. Cutting may be accomplished with diamond or other cutting blades on either tile or masonry saws. The saws may be provided as a saw assembly that may include a table for supporting a workpiece to be cut and structures for manipulating the position of the saw. Such saw assemblies may need to be transported between job sites and thus, there may be certain size limitations that must be considered to keep the saw assemblies portable. However, by limiting the size of the saw assembly, the size of the table and therefore also the size of the workpiece that can be cut may be limited.

BRIEF DISCLOSURE OF THE INVENTION

Therefore there is a need for a saw assembly that can provide sufficient capability to support larger workpieces and enable such workpieces to be effectively cut in consideration of space constraints. As such, some example embodiments may provide a saw assembly that includes a movement assembly configured to enable double movement of the saw and a workpiece support. Some example embodiments may provide for the movement of the workpiece support and the saw to move in opposite directions, and at a selected ratio (e.g., 2:1) to effectively increase the relative movement obtainable between the saw and the workpiece support so that larger workpieces can be cut on a small area.

In accordance with an example embodiment, a tile or masonry saw assembly may therefore be provided. The tile or masonry saw assembly may include a saw, a frame, and a workpiece support. The saw may include a motor operable to turn a blade assembly to cut a workpiece. The frame may be operably coupled to the saw to enable the saw to be moved along the frame in a first direction. The workpiece support may be operably coupled to the frame to support the workpiece relative to the saw, and to allow the workpiece support to be moved along the frame. The saw assembly further includes a movement assembly via which both movement of the workpiece support and movement of the saw relative to the frame is accomplished, such that a movement of the work piece support along the frame in a second direction is enabled to cause the saw to move along the frame in the first direction which is opposite the second direction.

BRIEF DESCRIPTION OF THE DRAWINGS

In the following description of preferred embodiments, reference will be made to the accompanying drawings, in which.

DESCRIPTION OF PREFERRED EMBODIMENTS

Figure 1:
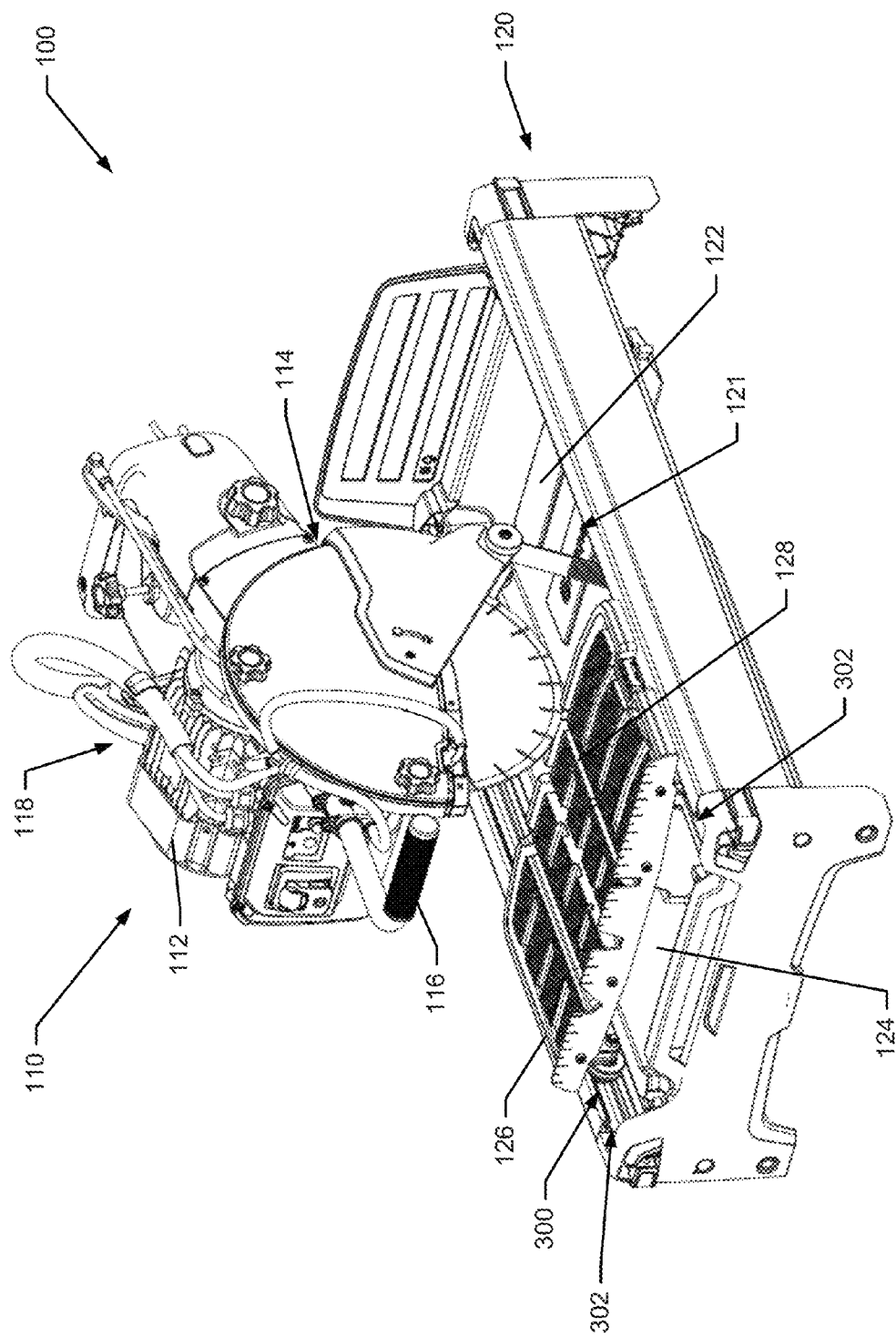
FIG. 1 shows a perspective view of a masonry saw employing a movement assembly in accordance with an example embodiment.

The present invention will be described more fully hereinafter with reference to the accompanying drawings, in which example embodiments of the invention incorporating one or more aspects of the present invention are shown. In the drawings, like numbers refer to like elements.

As mentioned above, some example embodiments may provide operators with the ability to increase the amount of relative motion that is achievable between a saw and a workpiece support so that larger workpieces can be cut in a smaller area. Some example embodiments may be employed in the context of wet cutting that is designed to reduce the amount of dust generated during a cutting operation. However, the water handling aspects of some components are not necessary to be implemented in all example embodiments. Thus, some example embodiments may be employed for dry cutting operations as well. FIGS. 1-7 show various views of portions of saws that employ example embodiments from different perspectives in order to facilitate description of some example embodiments.

Figure 3:
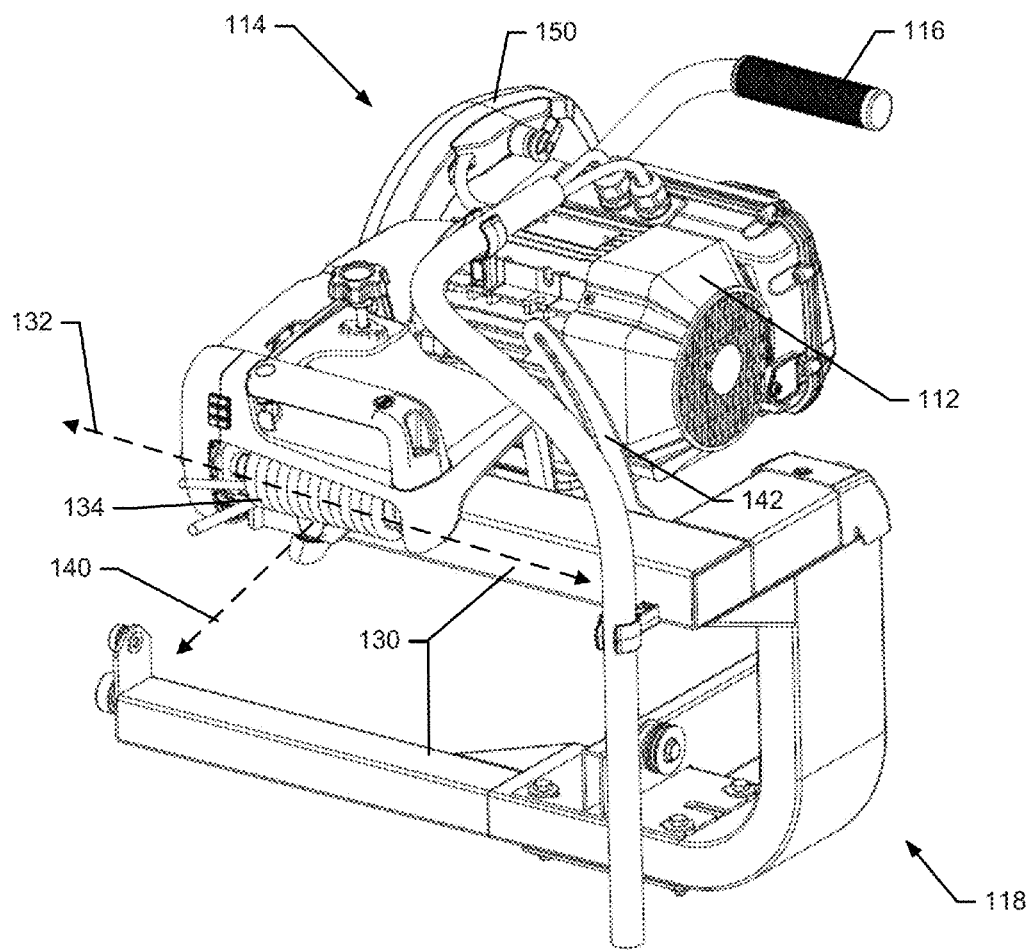
FIG. 3 shows a perspective, rear view of a saw in accordance with an example embodiment.

As shown at least in FIGS. 1 and 3, a tile or masonry saw assembly 100 may include a saw 110 and a frame 120. The frame 120 may generally support the saw 110 so that the saw can be moved relative to the frame 120 to execute cutting operations with the saw 110. The saw 110 may include a motor 112 that is operable responsive to selective application of power from a power source. Based on the power source employed, the motor 112 may be, for example, either electric powered or gasoline/petrol powered. Accordingly, responsive to application of power to the motor 112, the motor 112 may be configured to power a blade assembly 114 to cut a workpiece that may be, for example, tile, stone, brick, concrete or other such construction materials. The operator may at least partially control operation of the saw 110 via a handle 116 that allows a positioning assembly 118 of the saw 110 to be employed to move the saw 110 relative to the frame 120. As mentioned above, the saw 110 may employ wet cutting such that water is applied to the blade assembly 114 via mechanisms described in greater detail below.

The frame 120 may include a water collection system 121 that operates to collect at least some of the water that is applied to the blade assembly 114. The water collection system 121 may include a collector 122 disposed at one end of the frame 120. The collector 122 may extend between lateral sides of the frame 120 from one longitudinal end of the frame 120 toward a water tank 124 that is disposed at the opposite longitudinal end of the frame 120. Thus, the collector 122 and the water tank 124 may combine to form a surface for collecting any water expelled from the blade assembly 114 during operation.

The collector 122 may generally lie horizontally within the frame 120 and may include sloped sides that direct water from areas near the lateral edges of the collector 122 toward a longitudinal centerline of the frame 120. The collector 122 may also be sloped to direct water away from the longitudinal end of the frame 120 to which the collector 122 is proximate toward the water tank 124.

The water tank 124 may collect the water provided thereto by the collector 122 for reuse in application of water to the blade assembly 114. Thus, the water collection system 121 of an example embodiment may provide a relatively efficient way to apply, collect and reuse water for wet cutting. As mentioned above, the water collection system 121 and the components thereof may be omitted in some embodiments.

The frame 120 may also include a workpiece support 126, which may provide a framework for supporting workpieces that are to be cut using the saw 110. The workpiece support 126 may be a substantially planar support structure that extends transversely across the frame 120 to hold workpieces being cut. The workpiece support 126 may be enabled to slide or roll along the longitudinal length of the frame 120 such that it is supported above either or both of the collector 122 and the water tank 124. The workpiece support 126 may include trenches 128 or cutout portions that define recesses in which the cutting element of the blade assembly 114 may rotate when a cutting operation is conducted. The trenches 128 may also operate to direct any water that is sprayed therein or otherwise collects therein to either or both of the collector 122 and the water tank 124.

As shown in FIG. 3, the movement assembly 118 may include support arms 130 that are bent to form a U or C shape such that one arm of the U or C shape supports the saw 110 and the other arm of the U or C shape movably couples the saw 110 to the frame 120. The saw 110 may be pivotally mounted to one of the support arms 130 so that the saw 110 can pivot about a pivot axis 132 that is substantially perpendicular to the longitudinal length of the frame 120. In some cases, torsion springs 134 may be provided to facilitate rotation about the pivot axis 132 so that the operator can pivot the saw 110 with less manual force applied. In an example embodiment, rotation about a tilt axis 140 may also be possible so that the saw 110 may be tilted to achieve angled cuts. As such, the saw 110 may include a locking plate 142, which may include an arcuate slot inside which a clamping member may ride and be tightened to lock the saw 110 at a desirable tilt angle following rotation about the tilt axis 140. The tilt axis 140 may extend parallel to the longitudinal axis of the frame 120.

In an example embodiment, the blade assembly 114 may include a blade guard 150 that may be used to both apply and capture water used for wet cutting. The captured water may be delivered to the water collection system 121 for storage and/or reuse. In this regard, for example, a blade of the saw 110 may be at least partially housed within the blade guard 150. However, the blade guard 150 may leave less than half of the blade exposed and therefore shield only the remaining, unexposed portion.

Figure 2:
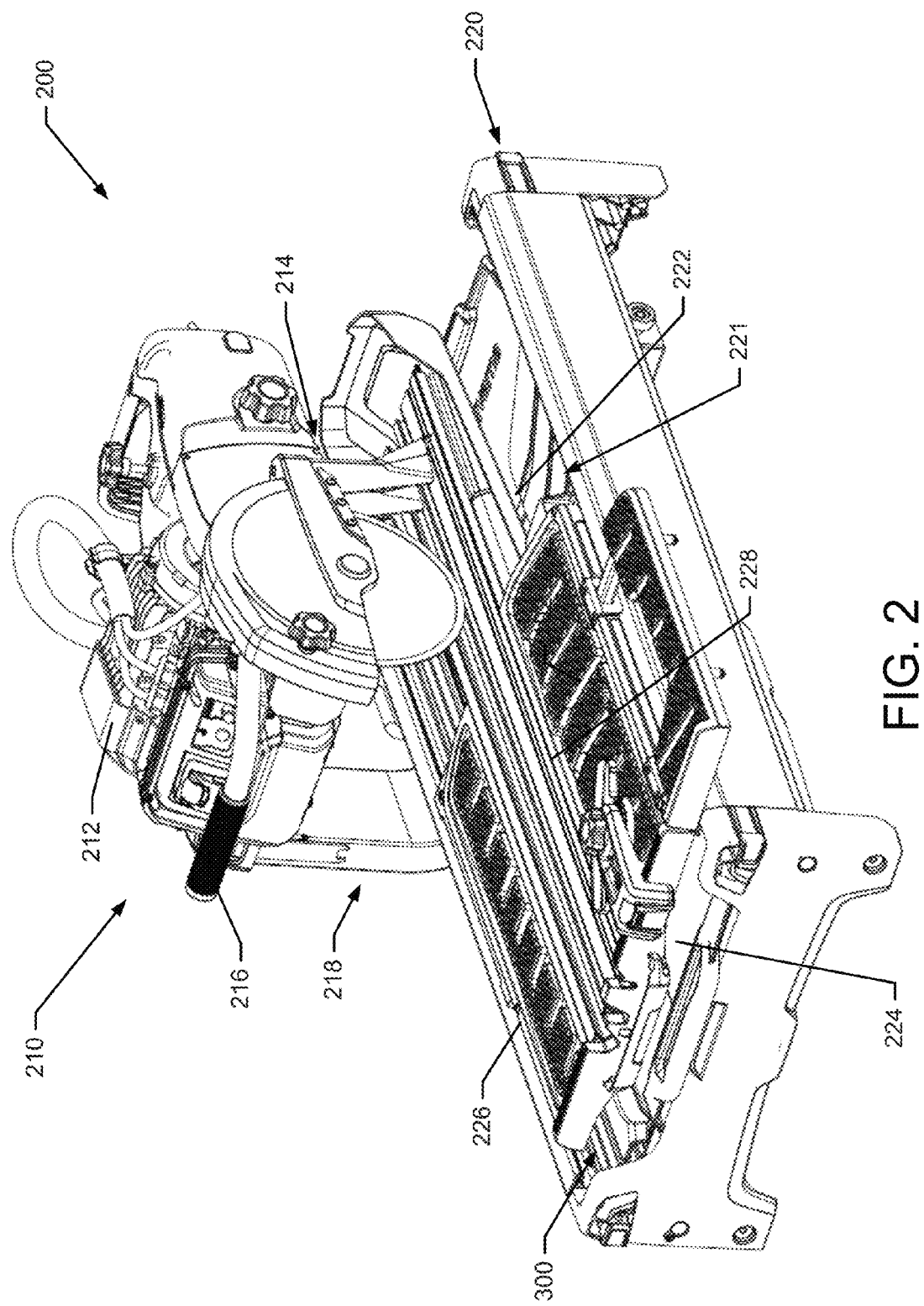
FIG. 2 shows a perspective view of tile saw employing the movement assembly of an example embodiment.
Figure 4:
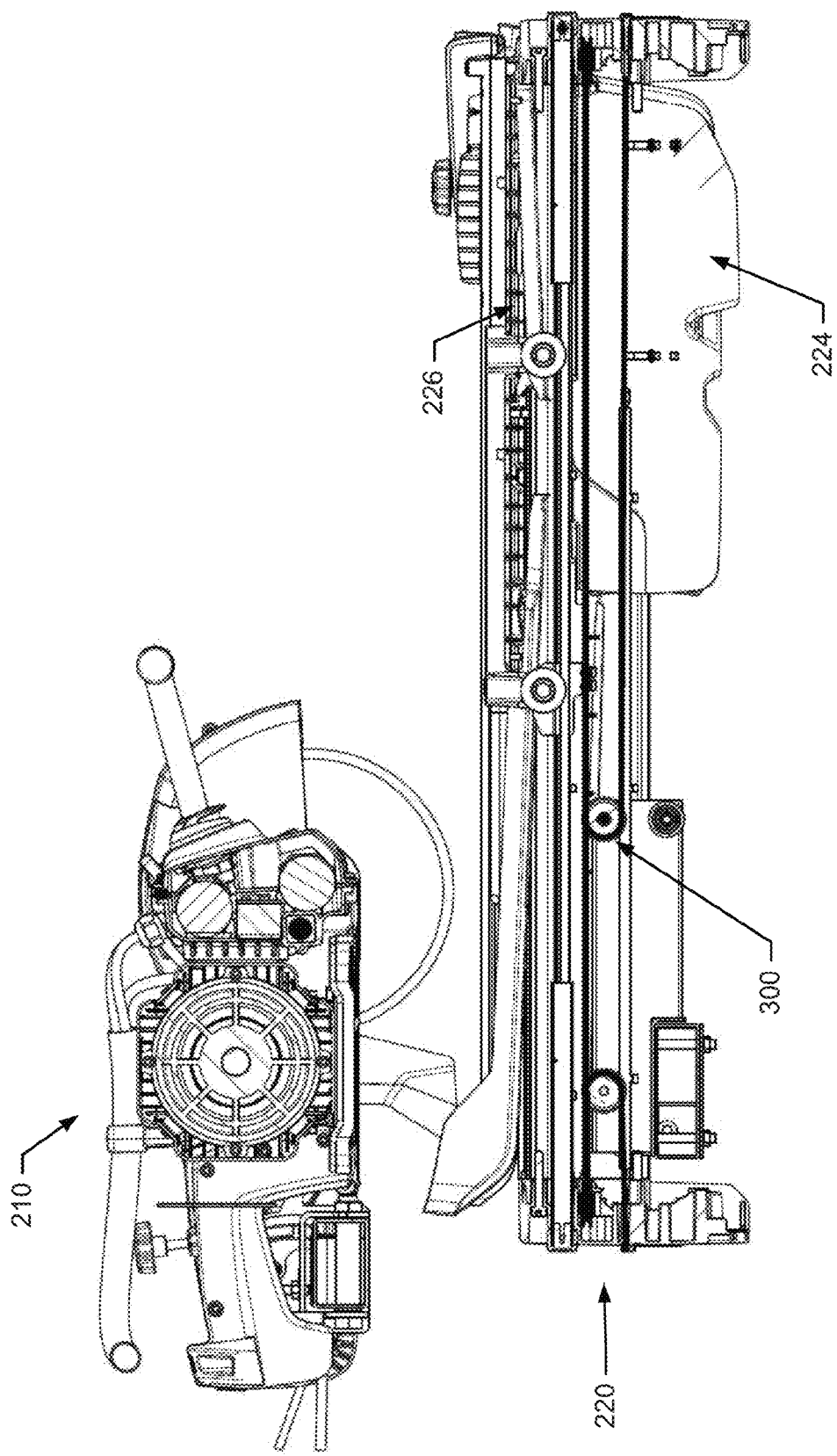
FIG. 4 shows a cross section view of the movement assembly in accordance with an example embodiment.

Although an example embodiment has been described above in the context of a masonry saw (i.e., masonry saw 100), it should be appreciated that example embodiments may also be practiced in other contexts. Accordingly, FIG. 2 is provided to illustrate a tile saw 200 that may employ an example embodiment. As such, the tile saw 200 includes many similar components to those described above including, but not limited to, a saw 210 and a frame 220. The saw 210 includes a motor 212 similar to the motor 112 described above. The saw 210 also includes a blade assembly 214 (which may include a blade guard similar to that described above), a handle 216 and a positioning assembly 218. Water may be directed to a water collection system 221 including a collector 222 and a water tank 224 similar to those described above. A workpiece support 226 may also be provided, and may include trenches 228 similar to those described above. The saw 210 may move longitudinally along one side of the frame 220 via a movement assembly 300 that includes a series of pulleys, rollers and a flexible coupling member to ride various rails or the like that extend along the frame 220 to enable the positioning assembly 118 or 218 to be operably coupled thereto. The movement assembly 300, which is also shown in FIG. 4, may therefore allow the saw 110 or 210 and/or the workpiece support 126 to be moved along the rails during or in preparation for engaging in cutting. In particular rollers may engage the rails as described below.

In an example embodiment, the rollers may be within a track system or otherwise some form of enclosure inside which the rollers may be maintained. The track system may keep the rollers from moving up/down, but allow the rollers to move freely along the length of the frame 120. The track system of the movement assembly 300 may be provided with an aperture 302 that is defined at one end and along each opposing side of the frame 120 of the saw assembly 100. The workpiece support 126 may be removed by sequentially removing the rollers that ride on the rails from the track system via the aperture 302. By enabling the workpiece support 126 to be removed, the saw assembly 100 may be cleaned and serviced more completely and easily.

Figure 5:
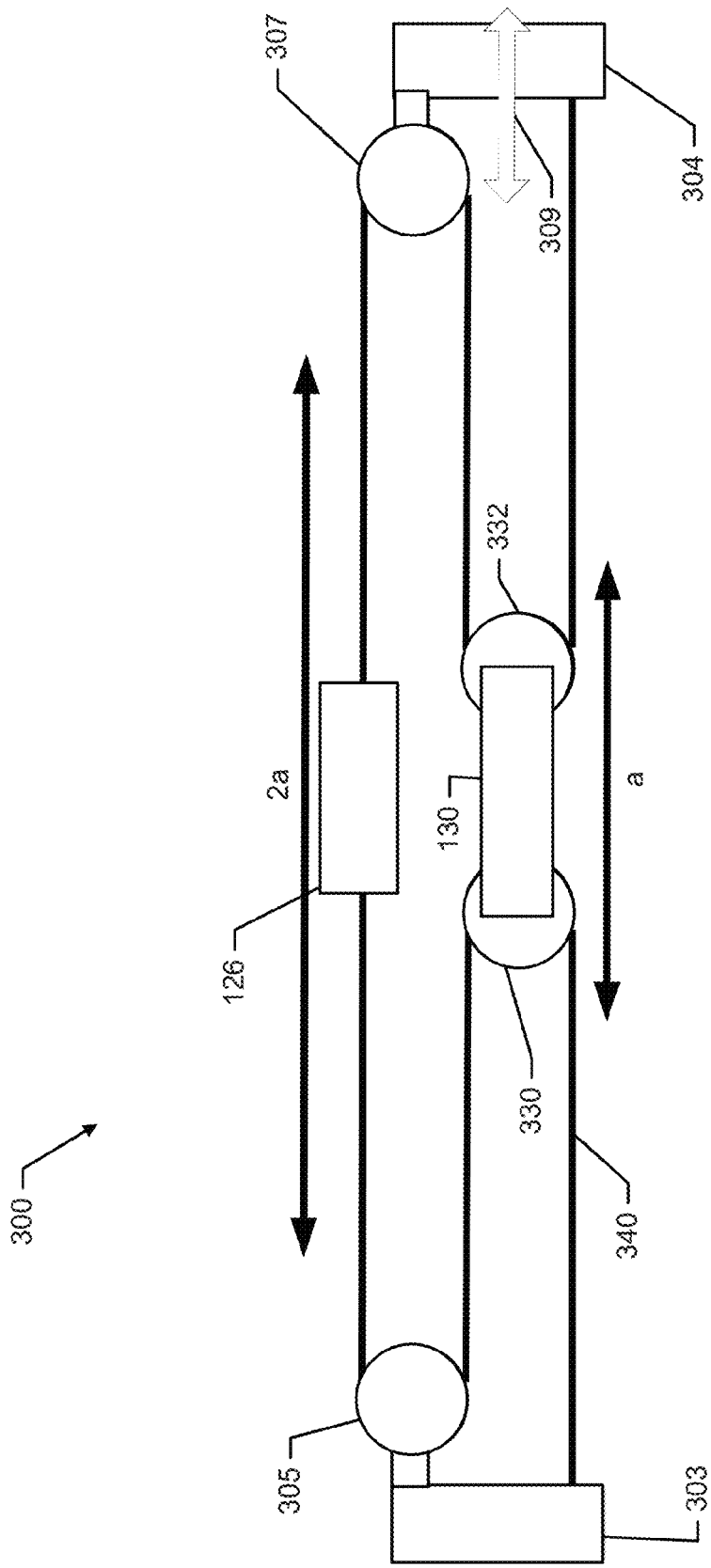
FIG. 5 shows a block diagram of the movement assembly in accordance with an example embodiment.
Figure 6:
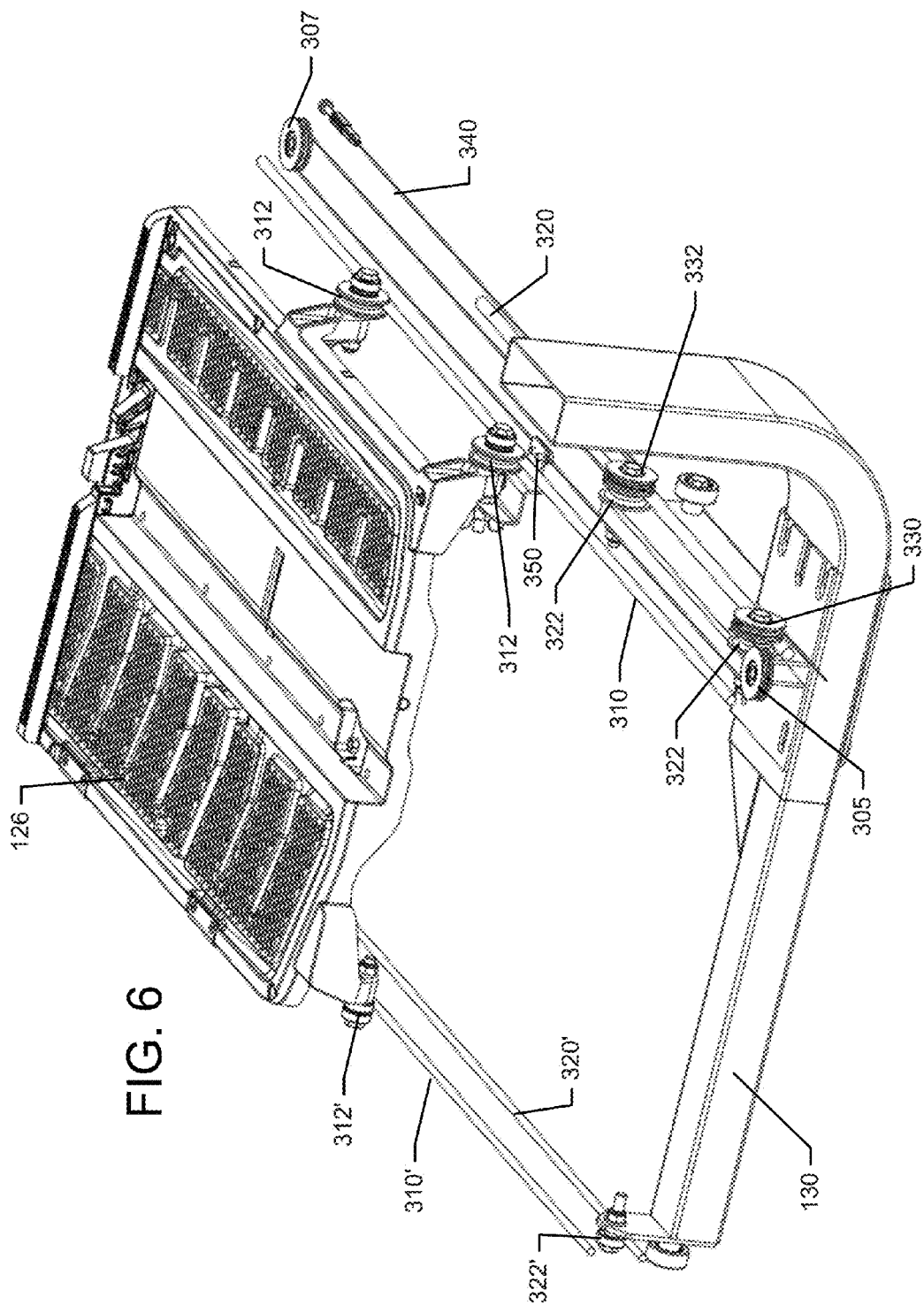
FIG. 6 shows a perspective view of some isolated components of the movement assembly in accordance with an example embodiment.

Referring now primarily to FIGS. 5 and 6, the movement assembly 300 will be described in greater detail. The movement assembly 300 may be provided to enable both the saw 110 and the workpiece support 126 to be moved relative to one another. In this regard, the movement assembly 300 may be configured to enable the saw 110 to be moved in one direction relative to the longitudinal length of the frame 120 while the workpiece support 126 is moved in the opposite direction. Moreover, the movement assembly 300 may be configured to provide a 2:1 ratio of movement of the workpiece support 126 relative to the movement of the saw 110. In other words, for example, if the range of motion of the workpiece support 126 is about 800 mm, then the range of motion of the saw 110 would be 400 mm.

The double movement with a 2:1 ratio described above may be accomplished via the structures of FIGS. 5 and 6. In this regard, pulleys, rails, rollers and cable may be employed within the aperture 302 and along sides of the frame 120 to provide surfaces upon which both the saw 110 and the workpiece support 126 may be movably supported. In an example embodiment, a first end member 303 and a second end member 304 may be provided at respective longitudinal ends of the frame 120. The first end member 303 may support a first fixed pulley 305 and the second end member 304 may support a second fixed pulley 307. As such, the first and second fixed pulleys 305 and 307 may be affixed to the first and second end members 303 and 304, respectively. In some cases, the first end member 303 may be rigidly affixed to the frame 120, but the second end member 304 may be moveable relative to the frame 120 as shown by double arrow 309. Meanwhile, a flexible coupling member (e.g., cable 340) may be fixed to the first and second end members 303 and 304. The flexible coupling member may be tightened by moving the second end member 304 away from the first end member 303. Alternatively both the first end member 303 and the second end member 304 could be a fixed part of the frame 120. Instead an end of the flexible coupling member could be fixed to either member 303 or member 304 via a togglescrew or similar enabling tightening of the flexible coupling member 340. Of note, the pictured example is described in the context of a flexible coupling member in the form of a cable, but any other such flexible coupling member may be substituted such as, for example, a chain, belt, rope and/or the like.

In an example embodiment, a first rail 310 and a second rail 320 may extend along the side of the frame 120, the sides preferably made of extruded aluminium. The first rail 310 may have a higher elevation than the second rail 320 within the frame 120 in some cases. In an example embodiment, the first rail 310 may be one of a pair of rails 310, 310' that extend along opposite sides of the frame 120 to support rollers of a first roller assembly 312, 312' that movably supports the workpiece support 126. Similarly, the second rail 320 may also be one of a pair of rails 320, 320' that extend along opposite sides of the frame 120 to support a second roller assembly 322, 322' that may be operably coupled to the support arm 130 of the saw 110. FIG. 6 shows an additional first rail 310' on the opposing side of the frame 120 relative to the first rail 310 of FIG. 6. The rails 310, 310', 320, 320' are rods of stainless steel that are fastened to the sides of the frame. Rollers of the second roller assembly 322, 322' may engage both pairs or second rails 320 and 320'. In some cases, two rollers of the second roller assembly 322 may engage the second rail 320 and one roller of the second roller assembly 322' may engage the additional second rail 320' so that the support arm 130 is supported at three points.

Figure 7:
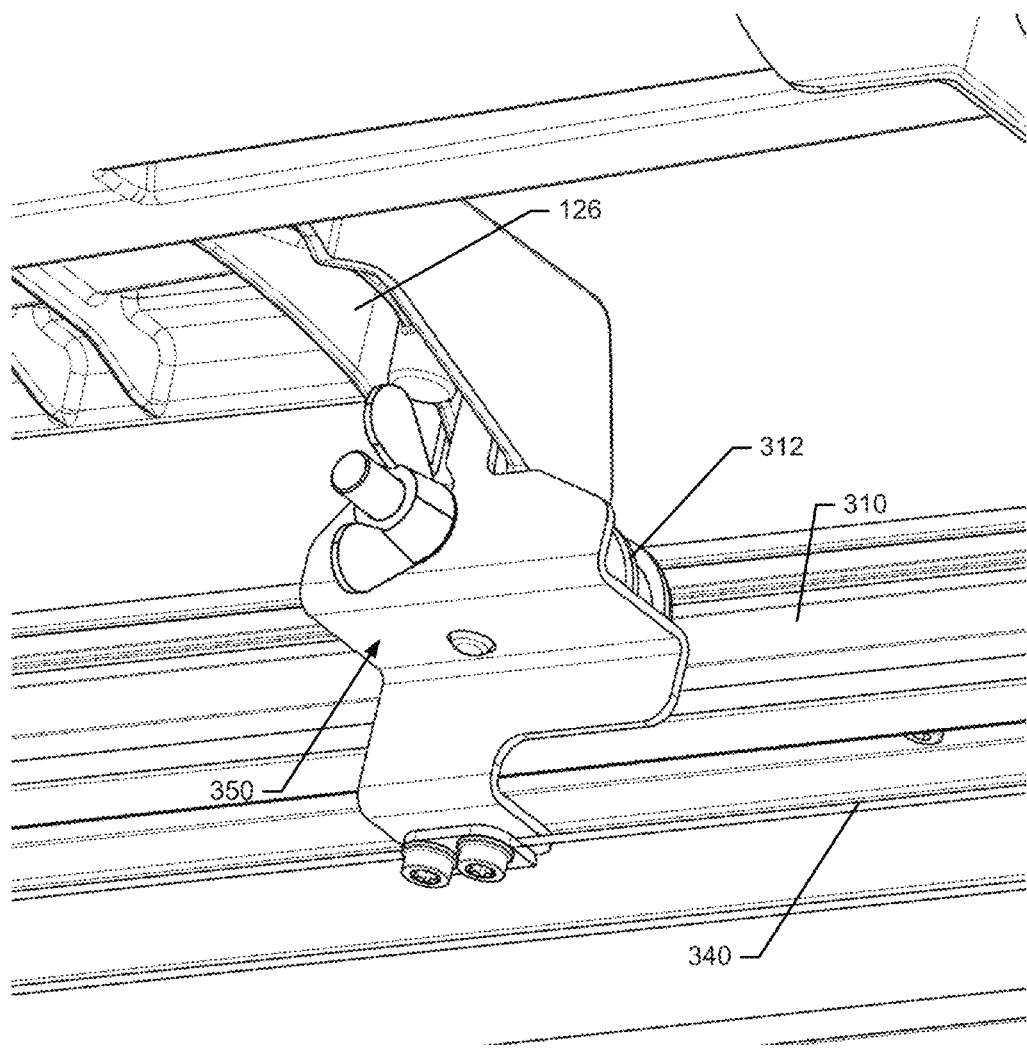
FIG. 7 shows a perspective view of a clamp of the movement assembly in accordance with an example embodiment.

The rollers of the second roller assembly 322 may be operably coupled to a first movable pulley 330 and a second movable pulley 332 that are operably coupled to cable 340 which is also coupled to the first and second fixed pulleys 305 and 307. Meanwhile, the workpiece support 126 may also be releasably coupled to the cable 340 via a clamp 350. As indicated above, some of the structures of the movement assembly 300 may be mirrored on the opposite side of the frame 120 as well. This mirroring is shown in FIG. 6 relative to the inclusion of rollers and rails along each side of the frame 120. Thus, the clamp 350 may be a first of two clamps on the side of the frame 120 on which the cable 340 is provided. However, in an example embodiment, only one clamp 350 may be employed to facilitate ease of operation as shown in FIGS. 6 and 7. In an example embodiment, the clamp 350 may include one or more threaded fasteners that may be tightened to fix the clamp 350 to the cable 340 as shown in FIG. 7.

As can be appreciated from FIG. 6, the support arm 130 is coupled to multiples ones of the rollers of the second roller assembly 322 (three in this example), and the rollers thereof may be spaced apart from each other. The first and second movable pulleys 330 and 332 are also positioned to correlate with the rollers of the second roller assembly 322. In some cases, the first and second movable pulleys 330 and 332 may actually be coaxial with the rollers of the second roller assembly 322 (although being coaxial is not required as separate shafts, even at angles relative to each other, are also possible). Thus, the support arm 130 (and therefore the saw 110) is in this example coupled to the cable 340 at two locations that are spaced apart from each other, but the two locations could be closer or even be the same if the movable pulleys 330 and 332 would sit side by side on a common shaft. The full range of movement that is available to the support arm 130 along the second rail 320 as the second roller assembly 32 moves along the second rail 320 may therefore be somewhat limited in the shown example.

In some cases, movement of the support arm 130 along the second rail 320 may cause corresponding movement of the first and second movable pulleys 330 and 332 over a predefined distance along the second rail 320. Meanwhile, movement of the workpiece support 126 along the first rail 310 may be enabled over a second predefined distance that may be about twice the first predefined distance based on the 2:1 ratio.

In some cases, the first and second fixed pulleys 305 and 307 may be disposed to lie in a plane substantially parallel to the plane in which the workpiece support 126 lies. However, the first and second movable pulleys 330 and 332 may lie in a plane that is substantially perpendicular to the plane in which the first and second fixed pulleys 305 and 307 lie. In an example embodiment, the rollers of the first roller assembly 312, and the rollers of the second roller assembly may each lie in respective different planes that are each substantially parallel to the plane in which the first and second movable pulleys 330 and 332 lie.

Based on the descriptions and drawings provided above, it should be appreciated that a tile or masonry saw assembly of an example embodiment may include a saw, a frame and a workpiece support. The saw may include a motor operable to turn a blade assembly to cut a workpiece. The frame may be operably coupled to the saw to enable the saw to be moved along the frame in a first direction. The workpiece support may be operably coupled to the frame to support the workpiece relative to the saw, and to allow the workpiece support to be moved along the frame. The saw assembly further includes a movement assembly via which both movement of the workpiece support and movement of the saw relative to the frame is accomplished, such that a movement of the work piece support along the frame in a second direction is enabled to cause the saw to move along the frame in the first direction which is opposite the second direction.

The saw assembly of some embodiments may include additional features that may be optionally added either alone or in combination with each other. For example, in some embodiments, (1) the movement assembly may be configurable to provide a 2:1 ratio for movement of the workpiece support compared to movement of the saw. In an example embodiment, (2), the movement assembly may include a first pair of rails to which the workpiece support is operably coupled via a first roller assembly, and a second pair of rails to which a support arm of the saw is operably coupled via a second roller assembly. In some example embodiments, (3) a first movable pulley and a second movable pulley, respectively, may be coupled to the support arm. The first and second movable pulleys may be operably coupled to a flexible coupling member. In some cases, (4) the first movable pulley and the second movable pulley may be coaxial with respective ones of rollers of the second roller assembly. In an example embodiment, (5) the workpiece support may be removably attached to the flexible coupling member. In some embodiments, (6) the workpiece support may be operably coupled to the flexible coupling member via a clamp that provides removable attachment between the workpiece support and the flexible coupling member.

In some embodiments, any or all of (1) to (6) may be employed in addition to the optional modifications or augmentations described below. For example, in some embodiments, movement of the support arm along the second rail causes corresponding movement of the first and second movable pulleys over a first predefined distance along the second rail. In such an example, movement of the workpiece support along the first rail may be enabled over a second predefined distance that is about twice the first predefined distance. Additionally or alternatively, the movement assembly may include a first fixed pulley fixed to a portion of the frame proximate to a first end of the first rail and a second fixed pulley fixed to a portion of the frame proximate to a second end of the first rail. The first and second fixed pulleys may be operably coupled to the flexible coupling member. Additionally or alternatively, the movement assembly may include a first end member to which the flexible coupling member is fixed at a portion of the frame proximate to a first end of the first rail and a second end member to which the flexible coupling member is fixed at a portion of the frame proximate to a second end of the first rail. Additionally or alternatively, at least one of the first end member or the second end member may be adjustably fixed to the frame, so that slack of the flexible coupling member is removable by tightening. Additionally or alternatively, the first and second fixed pulleys may lie in a plane substantially perpendicular to a plane in which the first and second movable pulleys lie. Additionally or alternatively, the support arm and the workpiece support may be movable independently of each other, or in correspondence with each other via the movement assembly. Additionally or alternatively, the first rail and the second rail may extend substantially parallel to each other and substantially parallel to a longitudinal centerline of the frame. Additionally or alternatively, an aperture may be arranged on both sides of the frame on at least one end of the saw, such that rollers of a corresponding end of the workpiece support are enabled to be lifted up through the aperture, and thereafter the rollers of the other end of the workpiece support are enabled to be lifted up through the same aperture. This feature could also be used for a saw having the support arm fixed to the frame, so that only the workpiece support could be moved along the frame. Additionally or alternatively, for a saw having a movement assembly the clamp may be enabled to be loosened relative to the flexible coupling member to enable the workpiece support to be lifted from the frame.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A tile or masonry saw assembly comprising:
   a saw including a motor operable to turn a blade assembly to cut a workpiece;
   a frame operably coupled to the saw to enable the saw to be moved along the frame in a first direction;
   a workpiece support operably coupled to the frame to support the workpiece relative to the saw, and to allow the workpiece support to be moved along the frame; and
   a movement assembly comprising a first pair of rails to which the workpiece support is coupled via a first roller assembly, a second pair of rails to which a support arm of the saw is coupled via a second roller assembly, a first movable pulley and a second movable pulley, respectively, coupled to the support arm, the first and second movable pulleys being operably coupled to a flexible coupling member, a first fixed pulley fixed to a portion of the frame proximate to a first end of the first rail, and a second fixed pulley fixed to a portion of the frame proximate to a second end of the first rail, the first and second fixed pulleys being operably coupled to the flexible coupling member;
   wherein the movement assembly is configured to enable both movement of the workpiece support and movement of the saw relative to the frame, such that a movement of the workpiece support along the frame in a second direction is enabled to cause the saw to move along the frame in the first direction which is opposite the second direction.

2. The saw assembly of claim 1, wherein the movement assembly is configurable to provide a 2:1 ratio for movement of the workpiece support compared to movement of the saw.

3. The saw assembly of claim 1, wherein the first movable pulley and the second movable pulley are coaxial with respective ones of rollers of the second roller assembly.

4. The saw assembly of claim 1, wherein the workpiece support is removably attached to the flexible coupling member.

5. The saw assembly of claim 4, wherein the workpiece support is operably coupled to the flexible coupling member via a clamp that provides removable attachment between the workpiece support and the flexible coupling member.

6. The saw assembly of claim 5, wherein an aperture is arranged on both sides of the frame on at least one end of the saw, such that rollers, of the first roller assembly, of a corresponding end of the workpiece support are enabled to be lifted up through the aperture, and thereafter the rollers, of the first roller assembly, of the other end of the workpiece support are enabled to be lifted up through the same aperture.

7. The saw assembly of claim 6, wherein the clamp is enabled to be loosened relative to the flexible coupling member to enable the workpiece support to be lifted from the frame.

8. The saw assembly of claim 1, wherein movement of the support arm along the second rail causes corresponding movement of the first and second movable pulleys over a first predefined distance along the second rail.

9. The saw assembly of claim 8, wherein movement of the workpiece support along the first rail is enabled over a second predefined distance that is about twice the first predefined distance.

10. The saw assembly of claim 1, wherein the movement assembly comprises a first end member to which the flexible coupling member is fixed at a portion of the frame proximate to a first end of the first rail and a second end member to which the flexible coupling member is fixed at a portion of the frame proximate to a second end of the first rail.

11. The saw assembly of claim 10, wherein at least one of the first end member or the second end member is adjustably fixed to the frame, so that slack of the flexible coupling member is removable by tightening.

12. The saw assembly of claim 1, wherein the first and second fixed pulleys lie in a plane substantially perpendicular to a plane in which the first and second movable pulleys lie.

13. The saw assembly of claim 1, wherein the support arm and the workpiece support are movable independently of each other, or in correspondence with each other via the movement assembly.

14. The saw assembly of claim 1, wherein the first rail and the second rail extend substantially parallel to each other and substantially parallel to a longitudinal centerline of the frame.

* * * * *